United States Patent [19]

Witt

[11] 4,414,861
[45] Nov. 15, 1983

[54] GEAR DRIVE COOLING

[75] Inventor: Ronald A. Witt, Milwaukee, Wis.

[73] Assignee: The Falk Corporation, Milwaukee, Wis.

[21] Appl. No.: 349,630

[22] Filed: Feb. 17, 1982

[51] Int. Cl.³ ............... F16H 57/04; F16H 57/02; F01M 5/00; F01M 1/00

[52] U.S. Cl. ............... 74/606 A; 74/467; 184/13 R; 184/6.22

[58] Field of Search .............. 74/467, 606 A; 184/104 R, 11 R, 13 R, 6.22, 6.12

[56] References Cited

U.S. PATENT DOCUMENTS

| | | | |
|---|---|---|---|
| 1,564,742 | 12/1925 | Acker | 74/606 A |
| 1,809,327 | 6/1931 | Badgley | 74/606 A |
| 1,904,412 | 4/1933 | Clouse | 184/104 R |
| 1,920,381 | 8/1933 | Greve | 184/13 R |
| 2,511,479 | 6/1950 | Olah | 184/11 R |
| 2,511,535 | 6/1950 | Lee | 184/11 R |
| 2,518,780 | 8/1950 | Hess | 74/606 A |
| 2,687,784 | 8/1954 | Klackner | 74/606 A |
| 2,714,824 | 8/1955 | Schmitter | 184/104 R |
| 3,625,310 | 12/1971 | Herrick | 184/13 R |
| 4,074,590 | 2/1978 | Jörg | 74/606 A |

FOREIGN PATENT DOCUMENTS

| | | | |
|---|---|---|---|
| 465236 | 4/1914 | France | 184/104 R |
| 18315 | of 1912 | United Kingdom | 184/104 R |

Primary Examiner—Lawrence J. Staab
Assistant Examiner—Michael D. Bednarek
Attorney, Agent, or Firm—Quarles & Brady

[57] ABSTRACT

A gear drive unit has a shaft mounted impeller which a series of blades or vanes inside the housing for the drive. The impeller vanes are positioned to be in the path of travel of oil flung off of a bull gear which rotates in an oil pan extending into an oil bath contained in the housing. The impeller is rotated by the impact of the oil against its vanes. In one embodiment, the rotating impeller drives a fan located outside the housing and the fan circulates air through a series of hollow tubes extending through the housing parallel to the impeller shaft. In another embodiment, the rotating impeller drives fans disposed outside of the housing at both ends of the impeller shaft.

6 Claims, 4 Drawing Figures

GEAR DRIVE COOLING

BACKGROUND OF THE INVENTION

This invention relates to the cooling of gear drives, and particularly to apparatus for converting the kinetic energy of splashing lubricant into mechanical energy which is employed to cool the gear drive.

It is common to use a system of splash lubrication to lubricate the meshing gearing and bearings of enclosed gear drive units such as speed reducers. The splash lubrication system involves partially immersing one of the rotating elements, usually a large gear, into an oil bath which is contained within the housing which also acts as a reservoir. As the element revolves, it dips into the oil or other lubricant and carries it along to the meshing gearing. Oil is also thrown off of the rotating gearing due to centrifugal force and its typically caught and collected in various troughs which lead through passages to the bearings so that the collected oil can lubricate the bearings.

The lubricant in such a system is heated by the gearing passing through it and also by the frictional losses due to the gear mesh and bearings. The oil must also function to conduct heat away from the meshing gearing and bearings. The amount of oil required will depend upon the amount of heat generated and the area of the housing which the oil can contact and through which the heat can be dissipated to the environment. As the velocity of the rotating gear at the pitch line increases, the heat losses due to the gear passing through the oil are increased by an exponential function. As a result, it has been typical to place an oil pan around the gear to minimize the amount of oil that the gear will contact as it revolves. The amount of oil entering the pan is controlled to provide sufficient lubrication for the revolving elements. This is typically done by providing a series of holes or slots in the pan at its low point. As the gear revolves, it will act as a pump and pull oil from the surrounding oil bath through the hole or slot into the pan. Oil is also forced through the holes or slots by the hydrostatic head of oil above the holes. The revolving gear picks up the entering oil and imparts its velocity to the oil thereby giving the oil kinetic energy. As the oil leaves the oil pan, it is thrown off the gear and out of the pan at a significant velocity which is close to the velocity of the pitch line of the gear. The kinetic energy of the oil is released in the form of shear energy as the oil strikes the interior surfaces of the housing. Heat is transferred to the housing by conduction, convection or radiation.

The amount of heat generated by a speed reducer or other enclosed gear drive can be considerable. Severe damage may occur if the speed reducer creates heat faster than it can be dissipated. To assist in dissipating the heat transferred to the housing, cooling fans have been typically employed on the input shafts to create a flow or air over the exterior surface of the housing.

SUMMARY OF THE INVENTION

In accordance with my invention, I provide an apparatus which converts the kinetic energy of the splashing lubricant which would normally strike the housing into mechanical energy which is used to rotate a cooling fan exterior of the housing. Specifically, I provide an impeller having vanes disposed in the path of travel of the fluid leaving a rotating gear, with the impeller being mounted on a shaft in the housing which is connected to a fan external of the housing and which is rotated by the force of the splashing oil striking the impeller.

Refinements of my invention include providing external cooling fans on both ends of the shaft which mounts the impeller, surrounding the impeller with a series of hollow tubes which are open at both ends to the exterior of the housing so that the fan can circulate air through the tubes to cool the interior of the housing, and providing a trough beneath the impeller to collect fluid dripping from the impeller so that the fluid may be directed to the bearings.

It is a principal object of the invention to provide a simple yet efficient mechanism for utilizing the kinetic energy of splashing lubricant within an enclosed speed reducer to drive a cooling fan.

It is another object of the invention to provide for improved dissipation of heat generated in a speed reducer using a splash lubrication system.

The foregoing and other objects and advantages of the invention will appear in the following description. In the description, reference is made to the drawings which illustrate preferred embodiments of the invention.

DETAILED DESCRIPTION OF THE PREFERRED EMBODIMENTS

Figure 1:
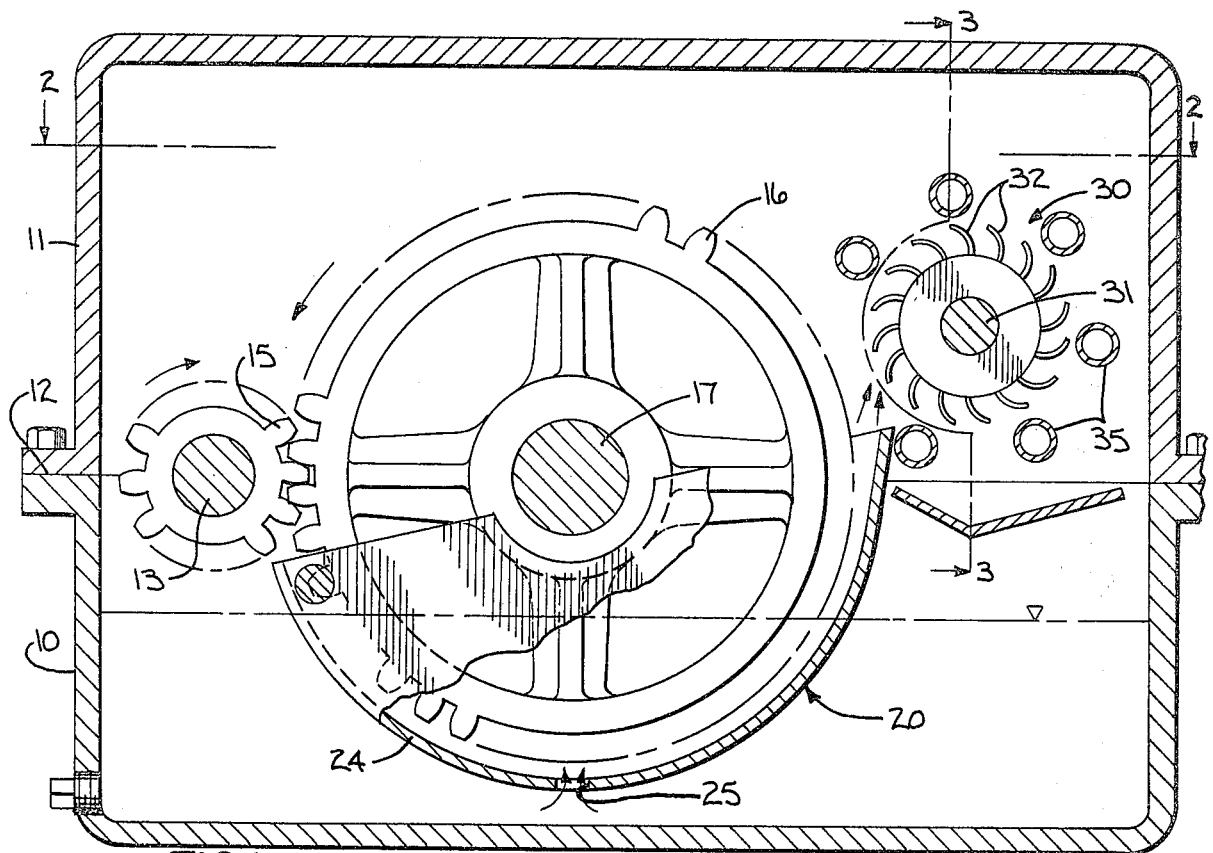
FIG. 1 is a view in vertical section taken through a gear drive which incorporates the present invention.
Figure 2:
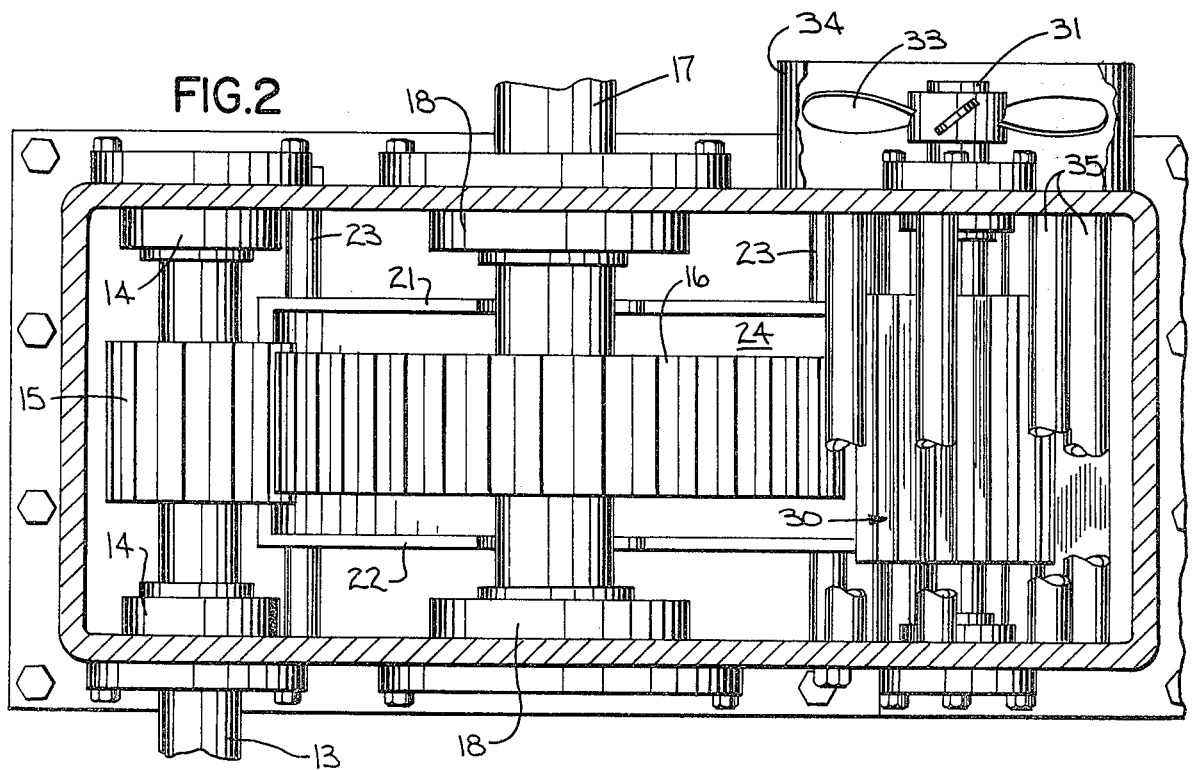
FIG. 2 is a view in horizontal section taken in the plane of the line 2—2 of FIG. 1.
Figure 3:
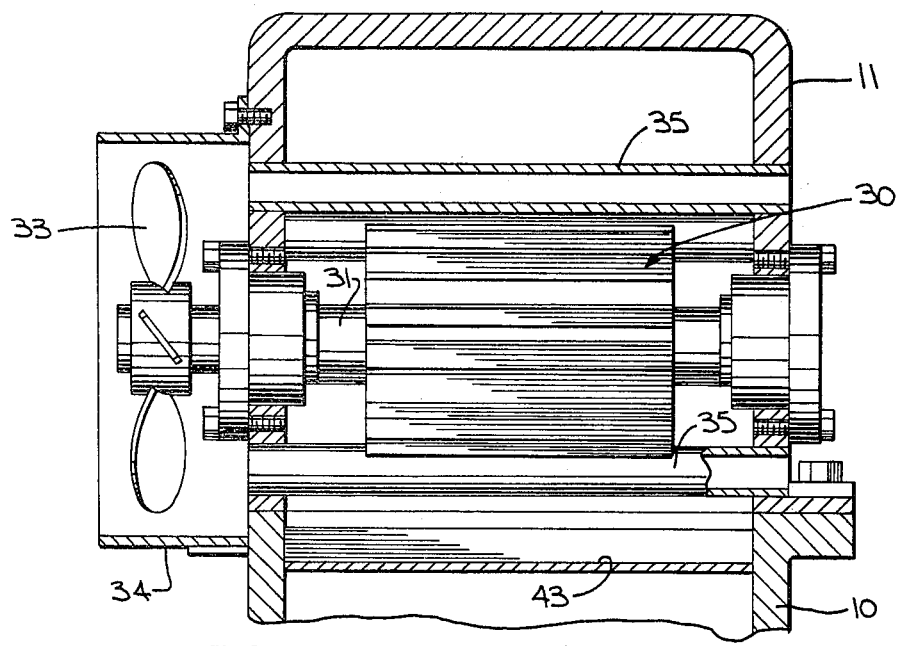
FIG. 3 is a view in vertical section taken in the plane of the line 3—3 of FIG. 1.

A gear drive has a housing formed of a lower portion 10 and upper portion 11 joined together on a parting line 12 which lies in a horizontal plane. A high speed input shaft 13 is journaled in bearings 14 supported in the housing at the parting line. The high speed input shaft 13 mounts a pinion 15 which meshes with a driven gear 16 on an output shaft 17. The output shaft 17 is journaled in bearings 18 supported in the housing at the parting line 12.

As is typical in gear drives, the lower portion 10 of the housing functions as a fluid reservoir for fluid which lubricates and cools the meshing gearing. The fluid is typically gear oil. The level of the gear oil in the reservoir at the base of the housing is illustrated by a phantom line in FIG. 1. An oil pan 20 extends into the reservoir of oil. The pan 20 includes sides 21 and 22 which are supported by the interior of the housing on rods 23. The oil pan 20 also includes an arcuate portion 24 which surrounds and is spaced from the periphery of the driven gear 16. The arcuate portion 24 of the oil pan is straightened to a tangent adjacent the end of the pan 20 which is farthest from the entry point of the gear 16 into the pan as the gear 16 rotates. A slot 25 is formed in the base of the oil pan 24. As the driven gear 16 is rotated, it will drawn and pump oil from the surrounding pool through the slot 25 to the interior of the oil pan 20. Oil is also forced through the slot 25 by the hydrostatic head of oil above the slot. The revolving driven gear 16 will pick up the oil entering the oil pan 20 and will impart to it a velocity giving that oil kinetic energy. As the oil exits the pan 20, it is thrown off of the gear 15 and out of the pan along the trajectory of the exit edge. The oil is thrown off at a significant velocity which is near the pitch line velocity of the gear 16.

An impeller, indicated generally by the numeral 30, is keyed on a transverse shaft 31 journaled in bearings in the housing sides. The impeller 30 has a series of vanes or blades 32. The impeller vanes 32 are positioned in the path of travel of the oil spray exiting the oil pan 20 and will be impacted by the oil spray to cause the impeller 30 to rotate thereby rotating the shaft 31. The shaft 31 projects beyond the housing and mounts a fan 33 exterior of the housing. The fan 33 is surrounded by a protective shroud 34. A plurality of hollow circular tubes 35 are spaced each end to the exterior of the housing. The fan 33 forces air through the tubes 35 thereby cooling the interior of the housing as well as the oil. The tubes 35 may be made of a material having a higher thermal conductivity than that of the typical steel housing and may also be finned to provide a greater surface area which the oil can contact.

Figure 4:
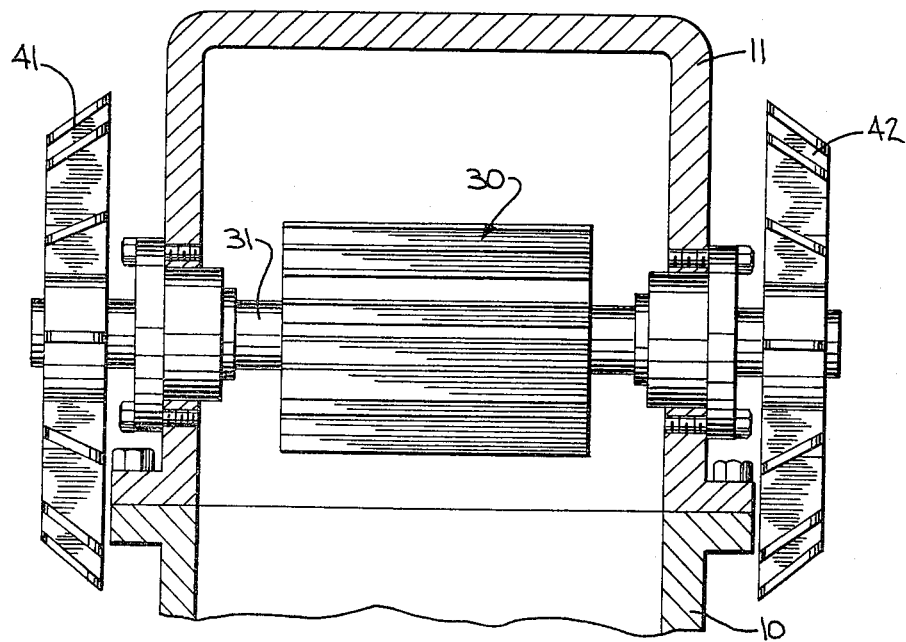
FIG. 4 is a view similar to FIG. 3 but showing an alternate embodiment of the invention.

Alternatively, as illustrated in FIG. 4, an impeller shaft 40 may extend beyond the housing at both ends and may mount fans 41 and 42, which will circulate air over the exterior of the housing to cool the housing.

Oil coming off of the impeller 30 is caught in a trough 43 disposed beneath the impeller shaft 31. The trough 43 can lead to passageways which carry oil collected in the trough 43 to the bearings, in a known manner. Examples of passageways leading from collector troughs to bearings are found in U.S. Pat. No. 3,029,661 issued Apr. 17, 1962 to W. P. Schmitter.

I claim:

1. In a gear drive which includes an enclosed housing defining a fluid reservoir, an input shaft and an output shaft each journaled in opposite side walls of the housing, and meshing gearing connecting the shafts including a gear which rotates through fluid in the reservoir, the improvement comprising:
    a rotatable impeller mounted on a shaft in the housing and having vanes which are in the path of fluid ejected from the periphery of the gear as it rotates, and
    a fan connected to the impeller shaft exterior of the housing.

2. A gear drive in accordance with claim 1 together with an oil pan surrounding that portion of the gear which extends into the fluid in the reservoir, said pan including a portion which projects above the fluid level in a direction generally tangential to the periphery of the gear so as to direct fluid ejected from the gear to the impeller vanes.

3. The gear drive in accordance with claim 2 wherein the oil pan closely surrounds the sides and periphery of the gear and includes an opening adjacent its low point through which fluid from the reservoir is drawn.

4. A gear drive in accordance with claim 1 wherein the impeller shaft is journaled in the opposite side walls of the housing and extends therethrough to mount fans to both projecting ends.

5. The gear drive in accordance with claim 1 together with a plurality of hollow tubes extending between the opposite side walls of the housing and spaced about the periphery of the impeller, said tubes being open at both ends to the exterior of the housing whereby air may be circulated by the fan through the tubes to cool the interior of the housing.

6. A gear drive in accordance with claim 1 together with a trough disposed beneath the impeller to collect fluid comming off the impeller.

* * * * *